United States Patent
Kato et al.

(10) Patent No.: US 6,490,397 B2
(45) Date of Patent: Dec. 3, 2002

(54) OPTICAL FIBER

(75) Inventors: Takatoshi Kato, Kanagawa (JP); Masashi Onishi, Kanagawa (JP); Yuji Kubo, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 50 days.

(21) Appl. No.: 09/732,933

(22) Filed: Dec. 11, 2000

(65) Prior Publication Data

US 2001/0010746 A1 Aug. 2, 2001

(30) Foreign Application Priority Data

Dec. 13, 1999 (JP) .............................. 11-353270

(51) Int. Cl.$^7$ ................................. G02B 6/02
(52) U.S. Cl. ........................ 385/123; 385/126
(58) Field of Search .................... 385/123–128

(56) References Cited

U.S. PATENT DOCUMENTS

| | | | | |
|---|---|---|---|---|
| 4,412,722 A | * | 11/1983 | Carnevale et al. | 385/124 |
| 4,435,040 A | * | 3/1984 | Cohen et al. | 385/127 |
| 5,448,674 A | * | 9/1995 | Vengsarkar et al. | 385/123 |
| 5,684,909 A | | 11/1997 | Liu | 385/127 |
| 5,822,488 A | * | 10/1998 | Terasawa et al. | 385/127 |
| 5,838,867 A | * | 11/1998 | Onishi et al. | 385/123 |
| 5,905,838 A | | 5/1999 | Judy et al. | 385/123 |
| 6,009,221 A | | 12/1999 | Tsuda | 385/123 |
| 6,317,549 B1 | * | 11/2001 | Brown | 385/123 |
| 6,343,176 B1 | * | 1/2002 | Li et al. | 385/127 |

FOREIGN PATENT DOCUMENTS

JP    11-281840    10/1999

* cited by examiner

*Primary Examiner*—Hemang Sanghavi
*Assistant Examiner*—Juliana K. Kang
(74) *Attorney, Agent, or Firm*—McDermott, Will & Emery

(57) ABSTRACT

An optical fiber whose chromatic dispersions have an opposite sign relative to those of the 1380 nm zero-dispersion fiber at all of the wavelengths in the range of 1450 nm to 1620 nm is provided. This optical fiber has negative chromatic dispersions at all of the wavelengths in this range and the values of which are $-7$ ps·nm$^{-1}$·km$^{-1}$ or more but $-1$ ps·nm$^{-1}$·km$^{-1}$ or less at a wavelength of 1450 nm, $-12$ ps·nm$^{-1}$·km$^{-1}$ or more but $-5$ ps·nm$^{-1}$·km$^{-1}$ or less at a wavelength of 1550 nm and $-17$ ps·nm$^{-1}$·km$^{-1}$ or more but $-6$ ps·nm$^{-1}$·km$^{-1}$ or less at a wavelength of 1620 nm. This optical fiber can compensate the dispersions of 1380 nm zero-dispersion fiber over the entire wavelength in this range.

5 Claims, 2 Drawing Sheets

OPTICAL FIBER

BACKGROUND OF THE INVENTION

1. Field of the Invention

The present invention relates to an optical fiber used as an optical transmission line in a Wavelength Division Multiplexing (WDM) transmission system.

2. Related Background Arts

A WDM transmission system can transmit a large volume of information at high bit rates using light signals each having a different wavelength. Restraining nonlinear optical phenomena and widening a light signal range are important problems in the WDM transmission system.

The optical fiber disclosed in the Japanese patent application laid open 11-281840 has a dispersion null point at the nominal wavelength value of $\lambda_0 = 1400$ nm with an OH absorption peak, and the values of chromatic dispersion of this fiber are of negative sign in the 1310 nm window and of positive sign in the 1550 nm window. In both windows this optical fiber provides for values of dispersion sufficiently high to maintain optical non-linear effects, for example four-wave mixing generation, within tolerable limits for WDM operation, and can widen a light signal range as well. This optical fiber is hereinafter called "the 1380 nm zero-dispersion fiber".

Chromatic dispersions of the 1380 nm zero-dispersion fiber are positive in a wide wavelength range (1450–1620 nm) that includes S-band (1450–1530 nm), C-band (1530–1560 nm) and L-band (1560–1620 nm). In the past there was no dispersion compensating optical fiber which compensated the chromatic dispersions of the 1380 nm zero-dispersion fiber at all of the wavelengths in the range of 1450 nm to 1620 nm.

SUMMARY OF THE INVENTION

It is an object of the present invention to provide an optical fiber whose chromatic dispersions have an opposite sign relative to those of the 1380 nm zero-dispersion fiber at all of the wavelengths in the range of 1450 nm to 1620 nm, and can compensate the dispersions of 1380 nm zero-dispersion fiber.

In order to achieve this and other objects, an optical fiber is provided whose chromatic dispersions are negative at all of the wavelengths in the range of 1450 nm to 1620 nm, having chromatic dispersions of $-7$ ps·nm$^{-1}$·km$^{-1}$ or more but $-1$ ps·nm$^{-1}$·km$^{-1}$ or less at a wavelength of 1450 nm, $-12$ ps·nm$^{-1}$·km$^{-1}$ or more but $-5$ ps·nm$^{-1}$·km$^{-1}$ or less at a wavelength of 1550 nm and $-17$ ps·nm$^{-1}$·km$^{-1}$ or more but $-6$ ps·nm$^{-1}$·km$^{-1}$ or less at a wavelength of 1620 nm.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
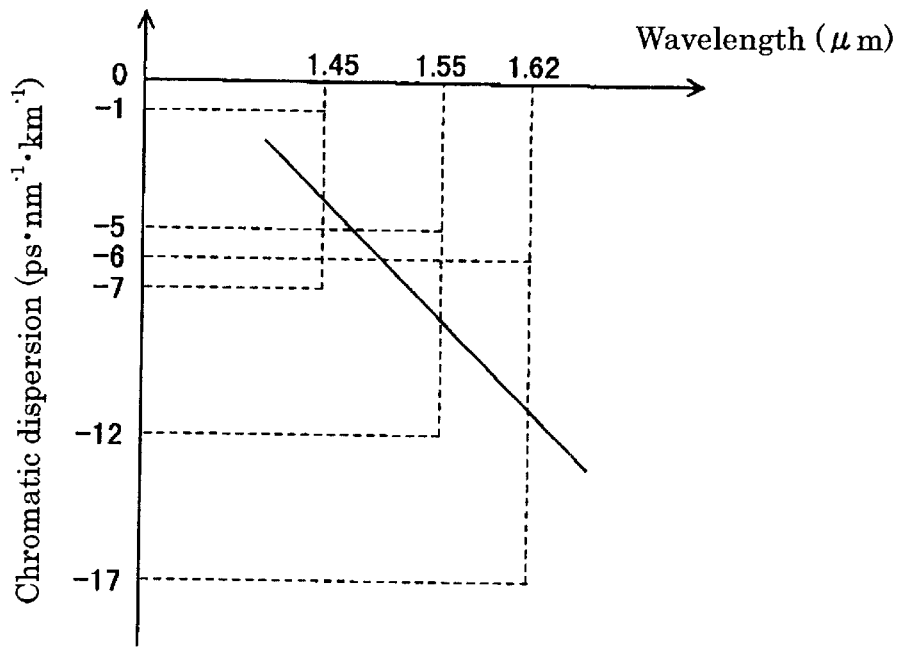
FIG. 1 is a graph plotting chromatic dispersion as a function of wavelength for the optical fiber according to an embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

As shown in FIG. 1, chromatic dispersions of the optical fiber according to the present invention are negative in the wide wavelength range of 1450 nm to 1620 nm that includes the S-band, C-band and L-band. The chromatic dispersions of this optical fiber are $-7$ ps·nm$^{-1}$·km$^{-1}$ or more but $-1$ ps·nm$^{-1}$·km$^{-1}$ or less at a wavelength of 1450 nm, $-12$ ps·nm$^{-1}$·km$^{-1}$ or more but $-5$ ps·nm$^{-1}$·km$^{-1}$ or less at a wavelength of 1550 nm and $-17$ ps·nm$^{-1}$·km$^{-1}$ or more but $6$ ps·nm$^{-1}$·km$^{-1}$ or less at a wavelength of 1620 nm. This optical fiber can compensate the chromatic dispersions of the 1380 nm zero-dispersion fiber at a wavelength in the range of 1450 nm to 1620 nm.

In particular it is preferable for an optical fiber according to an embodiment of this invention that a dispersion slope at a wavelength of 1550 nm be negative, and it is more preferable that a dispersion slope at a wavelength of 1550 nm be $-0.08$ ps·nm$^{-2}$·km$^{-1}$ or more but $-0.01$ ps·nm$^{-2}$·km$^{-1}$ or less. Because the optical fiber according to this embodiment has a dispersion slope of an opposite sign relative to that of the 1380 nm zero-dispersion fiber at a wavelength in the range of 1450 nm to 1620 nm, it can compensate the chromatic dispersions of the 1380 nm zero-dispersion fiber in the wide wavelength range.

In addition, it is preferable for an optical fiber according to an embodiment of this invention to have an effective area of 40 $\mu$m$^2$ or more, and more preferably 45 $\mu$m$^2$ or more, at a wavelength of 1550 nm. In this case, the generation of four-wave mixing can be restrained because the effective area is large.

Figure 2:
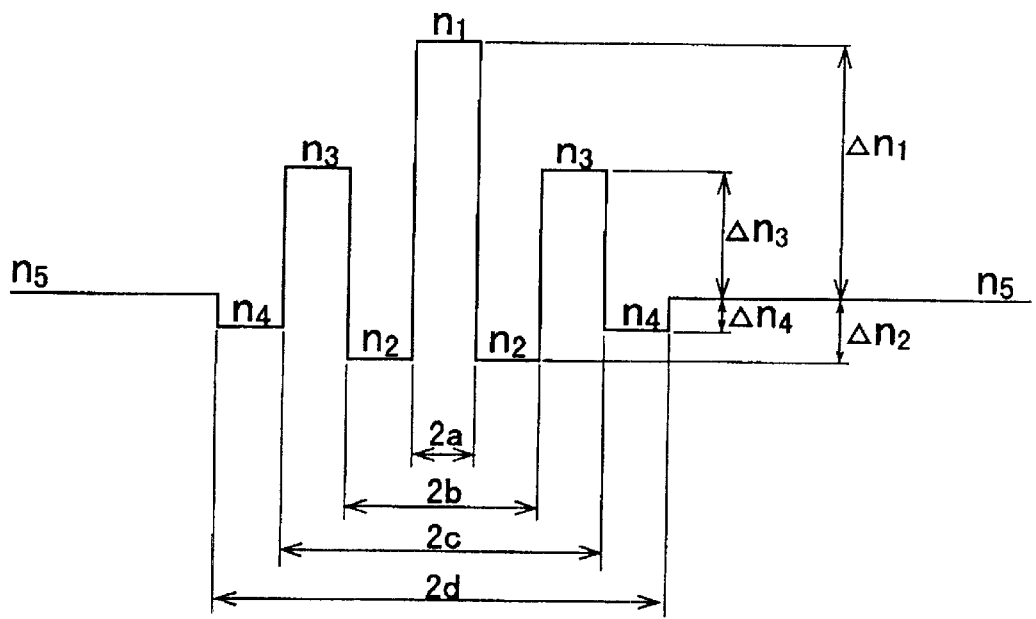
FIG. 2 shows a preferable example of the refractive index profile of an optical fiber according to an embodiment of the present invention.

FIG. 2 shows a preferable example of the refractive index profile of an optical fiber according to an embodiment of the present invention. The refractive index profile shown in FIG. 2 has, in the order of enumeration from the center of the optical axis, first core region (refractive index $n_1$, outer diameter $2a$), second core region (refractive index $n_2$, outer diameter $2b$), third core region (refractive index $n_3$, outer diameter $2c$), an inner cladding region (refractive index $n_4$, outer diameter $2d$), and an outer cladding region (refractive index $n_5$). The size relations of the respective refractive indexes are $n_1 > n_2$, $n_2 < n_3$, $n_3 > n_4$, $n_4 < n_5$.

The refractive index differences of each region are represented with $\Delta n_1$, $\Delta n_2$, $\Delta n_3$, and $\Delta n_4$ based on the refractive index of the outer cladding region $n_5$.

Next, five implementation examples regarding the optical fibers according to the present invention are explained in reference to Table I. The optical fibers of the implementation examples have the refractive index profile shown in FIG. 2. Cutoff wavelength $\lambda_C$ is defined as a LP 11 mode cutoff wavelength using a specimen which is 2 m long and wound one-turn with a 140 mm radius.

TABLE I

| | EXAMPLES | | | | |
|---|---|---|---|---|---|
| Example # | 1 | 2 | 3 | 4 | 5 |
| $\Delta n_1(\%)$ | 0.61 | 0.61 | 0.60 | 0.51 | 0.62 |
| $\Delta n_2(\%)$ | −0.10 | −0.10 | −0.08 | −0.08 | −0.08 |
| $\Delta n_3(\%)$ | 0.22 | 0.17 | 0.18 | 0.23 | 0.17 |
| $\Delta n_4(\%)$ | −0.10 | −0.10 | −0.08 | −0.08 | −0.08 |
| $2a(\mu m)$ | 5.1 | 4.9 | 4.9 | 5.5 | 4.8 |
| $2b(\mu m)$ | 16.5 | 15.2 | 15.2 | 17.9 | 15.8 |
| $2c(\mu m)$ | 28.3 | 27.5 | 27.6 | 27.9 | 27.1 |
| $2d(\mu m)$ | 42.2 | 41.0 | 41.2 | 41.6 | 40.4 |
| Chromatic dispersion $(ps \cdot nm^{-1} \cdot km^{-1})$ | | | | | |
| at 1450 nm | −5.1 | −6.7 | −9.0 | −5.4 | −6.3 |
| at 1550 nm | −8.4 | −8.0 | −11.2 | −8.3 | −6.4 |
| at 1620 nm | −13.0 | −9.7 | −12.1 | −9.1 | −7.1 |
| Dispersion slope $(ps \cdot nm^{-2} \cdot km^{-1})^{(1)}$ | −0.061 | −0.025 | −0.025 | −0.030 | −0.011 |
| Effective range $(\mu m^2)^{(1)}$ | 42.5 | 42.5 | 46.8 | 56.5 | 42.1 |
| Bend loss $(dB)^{(2)}$ | 0.03 | 0.09 | 0.08 | 0.40 | 0.05 |
| $\lambda_c$ (nm) | 2.02 | 0.69 | 0.86 | 1.97 | 1.67 |

[1]at 1550 nm
[2]at 1550 nm, 1 turn 32 mm

The chromatic dispersions of each optical fiber in the first through five implementation examples are negative at a wavelength in the range of 1450 nm to 1620 nm, and the chromatic dispersions are −7 ps·nm$^{-1}$·km$^{1-}$or more but −1 ps·nm$^{-1}$·km$^{1-}$or less at a wavelength of 1450 nm, −12 ps·nm$^{-1}$·km$^{1-}$or more but −5 ps·nm$^{-1}$·km$^{1-}$or less at a wavelength of 1550 nm and −17 ps·nm$^{-1}$·km$^{1-}$or more but −6 ps·nm$^{-1}$·km$^{1-}$or less at a wavelength of 1620 nm. In addition, a dispersion slope of each optical fiber of implementation examples 1 to 5 is −0.08 ps·nm$^{-2}$·km$^{1-}$or more but −0.01 ps·nm$^{-2}$·km$^{1-}$or less at a wavelength of 1550 nm, and the effective area is 40 $\mu m^2$ or more at a wavelength of 1550 nm. In particular, the effective areas for the implementation examples 3 and 4 are 45 $\mu m^2$ or more at a wavelength of 1550 nm.

Figure 3:
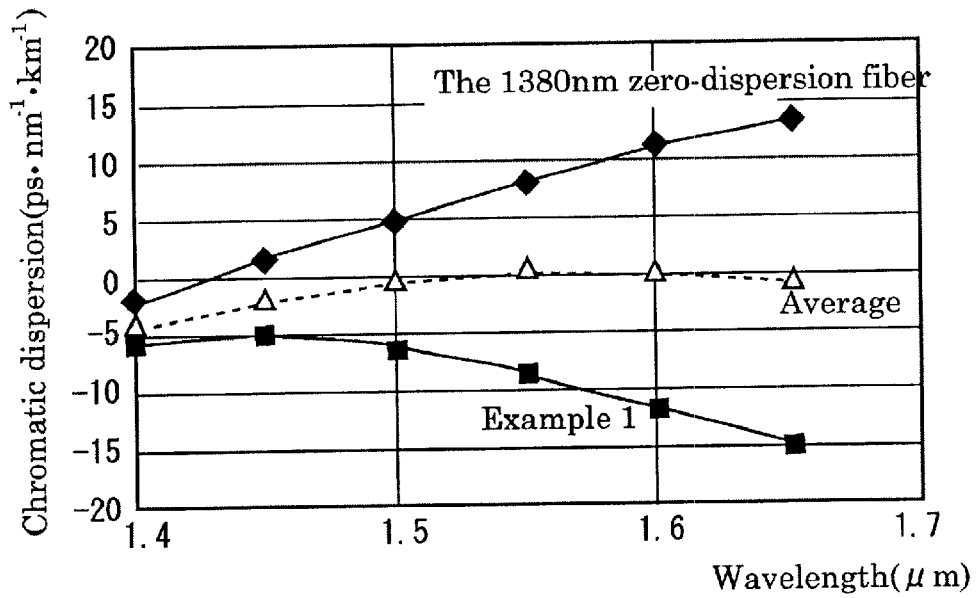
FIG. 3 plots chromatic dispersion as a function of wavelength for the optical fiber according to example 1 and the 1380 nm zero-dispersion fiber.

FIG. 3 plots chromatic dispersion as a function of wavelength for the optical fiber according to implementation example 1 and the 1380 nm zero-dispersion fiber. The signs of the chromatic dispersions of the optical fiber of the implementation example 1 and the 1380 nm zero-dispersion fiber are different from each other in the wavelength range of 1450 nm to 1620 nm, and the signs of their dispersion slopes are also different from each other. Accordingly if a transmission line is constructed with the two fibers each of which has the same length, the absolute value of the average chromatic dispersion of this transmission line is small and the absolute value of the accumulated dispersion through this transmission line is also small.

Figure 4:
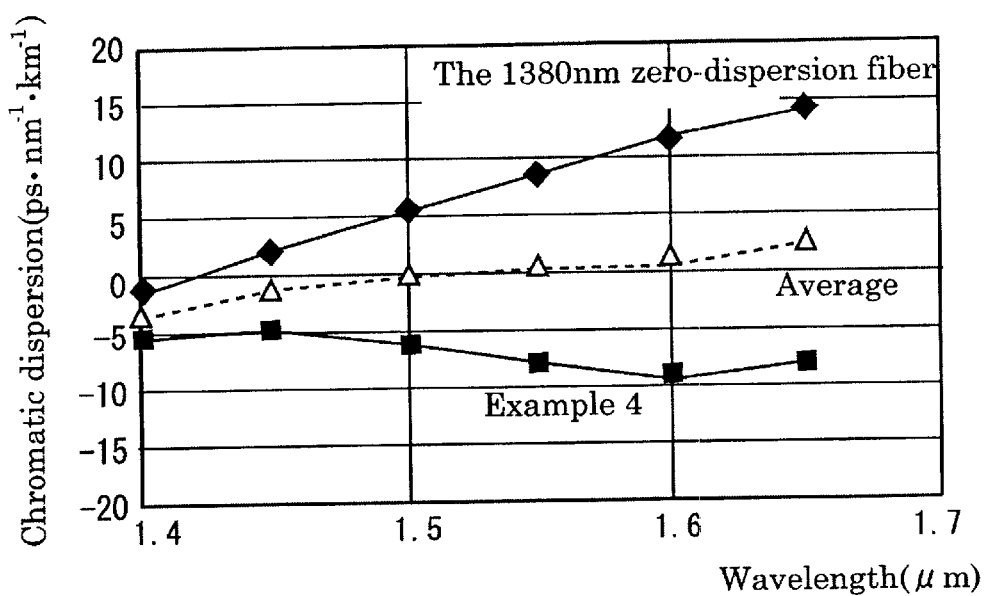
FIG. 4 plots chromatic dispersion as a function of wavelength for the optical fiber according to example 4 and the 1380 nm zero-dispersion fiber.

FIG. 4 plots chromatic dispersion as a function of wavelength for the optical fiber according to implementation example 4 and the 1380 nm zero-dispersion fiber. The signs of the chromatic dispersions of the optical fiber of the implementation example 4 and the 1380 nm zero-dispersion fiber are different from each other in the wavelength range of 1450 nm to 1620 nm, and the signs of their dispersion slopes are also different from each other. Accordingly if a transmission line is constructed with these two fibers having same length, the absolute value of the average chromatic dispersion of this transmission line is small and the absolute value of the accumulated dispersion through this transmission line is also small.

What is claimed is:

1. An optical fiber whose chromatic dispersions are negative at all of the wavelengths in the range of 1450 nm to 1620 nm, having chromatic dispersions of −7 ps·nm$^{-1}$·km$^{1-}$or more but −1 ps·nm$^{-1}$·km$^{1-}$or less at a wavelength of 1450 nm, −12 ps·nm$^{-1}$·km$^{1-}$or more but −5 ps·nm$^{-1}$·km$^{1-}$or less at a wavelength of 1550 nm and −17 ps·nm$^{-1}$·km$^{1-}$or more but −6 ps·nm$^{-1}$·km$^{1-}$or less at a wavelength of 1620 nm.

2. An optical fiber according to claim 1, wherein the dispersion slope thereof is negative at a wavelength of 1550 nm.

3. An optical fiber according to claim 2, wherein the dispersion slope thereof is −0.08 ps·nm$^{-2}$·km$^{1-}$or more but −0.01 ps·nm$^{-2}$·km$^{1-}$or less at a wavelength of 1550 nm.

4. An optical fiber according to claim 1, wherein the effective area thereof is 40 $\mu m^2$ or more at a wavelength of 1550 nm.

5. An optical fiber according to claim 4, wherein the effective area thereof is 45 $\mu m^2$ or more at a wavelength of 1550 nm.

* * * * *